(12) United States Patent
Walser

(10) Patent No.: US 7,931,290 B2
(45) Date of Patent: Apr. 26, 2011

(54) MOTORCYCLE FLUID COOLER

(76) Inventor: David Jerome Walser, New Ulm, MN (US)

( * ) Notice: Subject to any disclaimer, the term of this patent is extended or adjusted under 35 U.S.C. 154(b) by 114 days.

(21) Appl. No.: 12/074,353

(22) Filed: Mar. 3, 2008

(65) Prior Publication Data

US 2009/0218156 A1 Sep. 3, 2009

(51) Int. Cl.
*B60K 11/04* (2006.01)
(52) U.S. Cl. .......................... 280/293; 180/68.4; 180/229
(58) Field of Classification Search .................. 180/229, 180/68.4; 280/293
See application file for complete search history.

(56) References Cited

U.S. PATENT DOCUMENTS

| 4,662,470 A | * | 5/1987 | Fujisawa et al. | 180/219 |
| 4,697,664 A | * | 10/1987 | Kohyama | 180/226 |
| 5,653,206 A | | 8/1997 | Spurgin | |
| 5,992,552 A | * | 11/1999 | Eto | 180/190 |
| 5,996,717 A | | 12/1999 | Hisadomi | |
| 2002/0162693 A1 | | 11/2002 | Mizuno et al. | |
| 2008/0017431 A1 | | 1/2008 | Sadakuni et al. | |

FOREIGN PATENT DOCUMENTS

WO    WO 02/04282    1/2002

* cited by examiner

*Primary Examiner* — Kevin Hurley
(74) *Attorney, Agent, or Firm* — Hollingsworth & Funk, LLC

(57) ABSTRACT

A motorcycle fluid cooler assembly includes a heat exchanger and a mounting member coupled to the heat exchanger. The mounting member is adapted for mounting the heat exchanger to a first footrest mounting point of a motorcycle frame so that the heat exchanger transversely extends externally to the motorcycle frame when mounted. Fluid ports are coupled to the heat exchanger, and a footrest member is coupled to the heat exchanger. The footrest member is positioned as a rider footrest when the heat exchanger is mounted.

23 Claims, 5 Drawing Sheets

MOTORCYCLE FLUID COOLER

FIELD OF THE INVENTION

The present invention relates in general to motorcycle fluid coolers such as oil coolers.

BACKGROUND OF THE INVENTION

Air cooled piston engines rely on the circulation of air around the pistons and other hot parts for cooling. While many applications, such as automobiles, have favored circulating a liquid around the engine for cooling, air cooled engines are still favored in many applications. An air-cooled engine will usually have lower weight, be more compact, and have less mechanical complexity than a similar liquid cooled engine. For this reason, air-cooled engines are still commonly used in smaller vehicles such as motorcycles.

Many motorcycles use air-cooled engines to reduce weight and complexity. In particular, popular motorcycle engines commonly designated as "V-twin" and associated with motorcycles manufactured by Harley-Davidson Motorcycle Company, remain air cooled. While air cooling provides effective heat transfer for the metal engine parts for V-twin type engines, in some conditions, additional cooling provisions may be needed for the engine oil.

In some conditions, such as when the motorcycle is idled and the outside air temperature is relatively high, the oil temperature increases beyond a safe operating temperature. This may result in a loss of needed lubrication properties (e.g., viscosity) and may also cause a loss of oil pressure. As such, external oil coolers are sometimes provided to assist in maintaining safe oil pressure.

Typically, factory and aftermarket oil coolers include a heat exchanger (e.g., a finned radiator) that is designed to mount on the frame directly in front of the engine and behind the front wheel. This location has some advantages, such as shortening the length of oil supply lines and keeping the hot heat exchanger away from the rider's legs. However, the front wheel, fenders, forks, and other bike mounted accessories cause a blockage of some of the airflow that reaches such a radiator. Further, the close proximity to the hot engine may somewhat reduce the effectiveness of the heat exchanger. As a result, this type of oil cooler needs to be sized larger (and thus heavier) than would otherwise be required to account for the airflow blockages and engine heat. Because lower weight provides increased motorcycle performance, an improved, lower weight, oil cooler filter heat exchanger is desirable.

SUMMARY OF THE INVENTION

To overcome limitations in the prior art described above, and to overcome other limitations that will become apparent upon reading and understanding the present specification, the present specification discloses an apparatus and method for motorcycle fluid cooling. In one embodiment, a fluid cooler assembly includes a heat exchanger and a mounting member coupled to the heat exchanger. The mounting member is adapted for mounting the heat exchanger to a first footrest mounting point of a motorcycle frame so that the heat exchanger transversely extends externally to the motorcycle frame in a mounted configuration of the fluid cooler assembly. Fluid ports are coupled to the heat exchanger, and a footrest member is coupled to the heat exchanger. The footrest member is positioned as a rider footrest in the mounted configuration of the fluid cooler assembly In more particular embodiments, the heat exchanger may include an oil cooler. In other arrangements, the fluid cooler assembly of may further a include a second heat exchanger, a second mounting member coupled to the second heat exchanger and adapted for mounting the second heat exchanger to a second footrest mounting point of the motorcycle frame so that the second heat exchanger transversely extends externally to the motorcycle frame in the mounted configuration of the fluid cooler assembly. In this case, second fluid ports are coupled to the second heat exchanger and a second footrest member is coupled to the second heat exchanger. The second footrest member is positioned as a second rider footrest when the second heat exchanger is in the mounted configuration of the fluid cooler assembly. In a more particular example of this arrangement, the second mounting member, second heat exchanger, second fluid ports, and second footrest member are mirror images, respectively, of the mounting member, the heat exchanger, the fluid ports, and the footrest member.

In another, more particular embodiment of the fluid cooler assembly, the heat exchanger includes airflow voids disposed substantially parallel to a longitudinal axis of the motorcycle, and internal surfaces of the airflow voids include fluid cooling surfaces of the heat exchanger. In other configurations, the footrest member may include a plate, and/or the fluid cooler assembly may include a thermal insulating member coupled between the footrest member and the heat exchanger. In the latter case, a dimension of the insulating member is adjustable to facilitate varying a distance between the heat exchanger and the footrest member. In another, more particular embodiment of the fluid cooler assembly, the first footrest mounting point includes a driver footrest mounting point.

In another embodiment of the invention, a motorcycle includes a frame having a footrest mount point at a rider footrest position and an engine having two or more fluid lines. A first, footrest-integrated, fluid cooler is mounted to the footrest mount point. The fluid cooler includes a heat exchanger extending outward from the frame proximate to the footrest mount point and two or more fluid ports that provide fluid coupling between the heat exchanger and the fluid lines. A footrest member of the fluid cooler is coupled to the heat exchanger so that the footrest member is positioned as a rider footrest when the first fluid cooler is mounted. The first fluid cooler may include an oil cooler.

In a more particular embodiment, the frame further includes a second footrest mount point at a second footrest position. In this case, the motorcycle further includes a second, footrest-integrated, fluid cooler mounted to the second footrest mount point. The second fluid cooler includes a second heat exchanger extending outward from the frame proximate to the second footrest mount point and two or more second fluid ports providing fluid coupling between the second heat exchanger and the fluid lines. A second footrest member of the second fluid cooler is coupled to the second heat exchanger so that the second footrest member is positioned as a second rider footrest when the second fluid cooler is mounted. The second fluid cooler may be a mirror image of the first oil cooler.

In another embodiment of the invention, a method involves mounting a fluid cooler assembly to a first footrest mounting point of a motorcycle frame so that the fluid cooler assembly transversely extends externally to the motorcycle frame when mounted. A footrest member is mounted proximate to a heat exchanger of the fluid cooler assembly. The footrest member is positioned as a rider footrest when the fluid cooler assembly is mounted. The heat exchanger is fluidly coupled to an engine of the motorcycle so that the heat exchanger cools an engine fluid. The engine fluid may include engine oil.

In a more particular embodiment, the method further includes mounting a second fluid cooler assembly to a second footrest mounting point of the motorcycle frame so that the second fluid cooler assembly transversely extends externally to the motorcycle frame when mounted. A second footrest member is mounted proximate to a second heat exchanger of the second fluid cooler assembly, such that the footrest member is positioned as a rider footrest when the second fluid cooler assembly is mounted. The second heat exchanger is fluidly coupled to the engine of the motorcycle so that the second heat exchanger cools the engine fluid. In another arrangement, the method further involves facilitating adjusting a distance between the heat exchanger and the footrest member to adapt the footrest member for varying conditions of use.

These and various other advantages and features of novelty which characterize the invention are pointed out with particularity in the claims annexed hereto and form a part hereof. However, for a better understanding of the invention, reference should be made to the drawings which form a further part hereof, and to accompanying descriptive matter, in which there are illustrated and described representative examples of apparatuses and methods in accordance with the invention.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Figure 1:
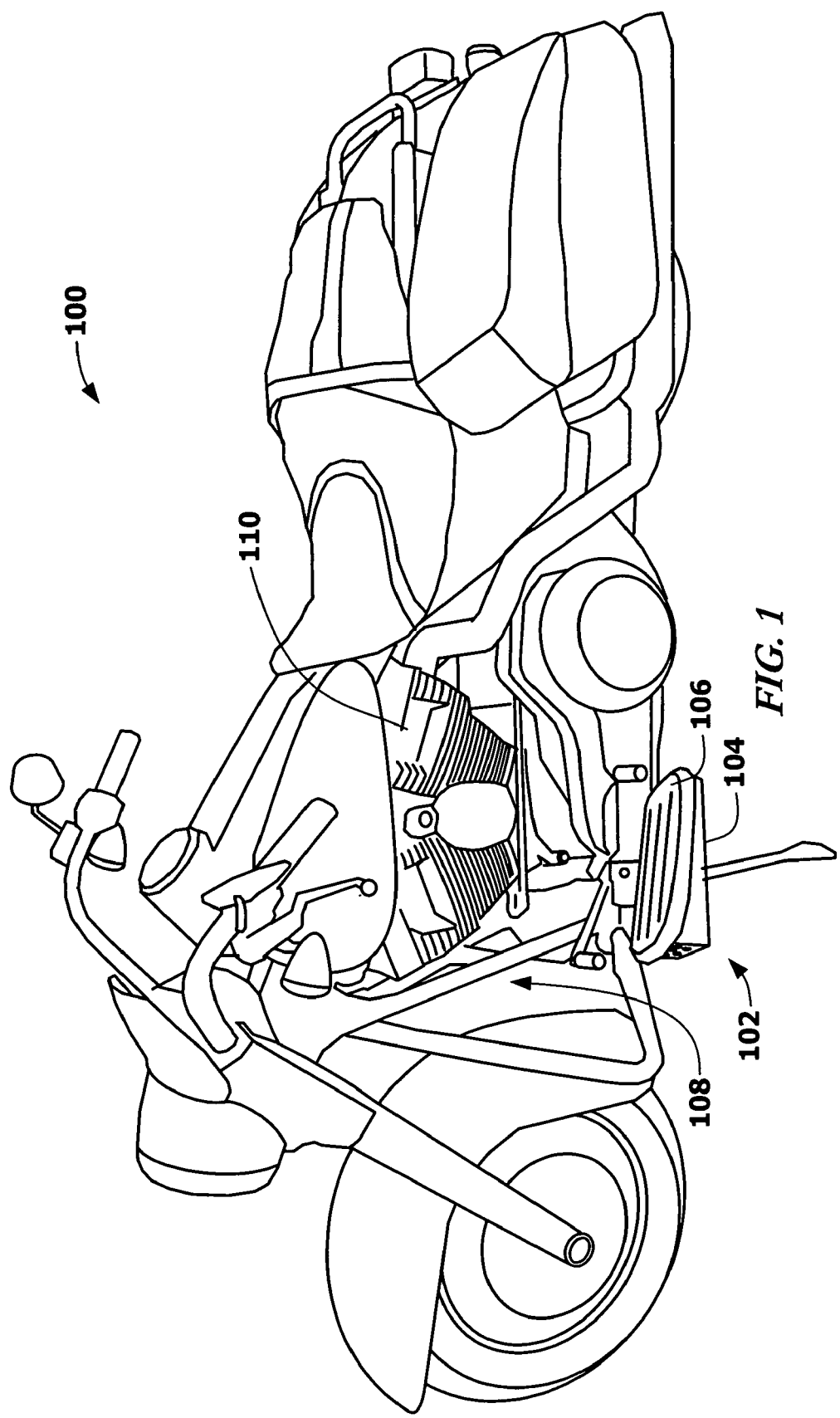
FIG. 1. is a left-side perspective view of a motorcycle having an oil cooler according to an embodiment of the invention.

In reference now to FIG. 1, a left perspective view of a V-twin type motorcycle 100 shows an oil cooler assembly 102 according to an embodiment of the invention. The oil cooler assembly 102 includes a heat exchanger 104 that is coupled with a foot rest plate 106. The oil cooler assembly 102 therefore forms a single-piece, floorboard-integrated heat exchanger. The assembly 102 may include a mirror image cooler (not shown) be mounted on the other side of the motorcycle 100. The cooler assembly 102 may be combined with similar passenger-footrest-located coolers, and/or with other oil coolers mounted in typical locations, the latter generally indicated by frame mount area 108 forward of the motorcycle engine 110.

It will be apparent that there are a number of advantages in the floorboard integrated oil cooler 102. The heat exchanger 104 extends transversely relative to the forward-aft axis of the motorcycle 100 where there are no structures to block airflow to the exchanger 104. The heat exchanger 104 is still relatively close to the engine 110, thus oil supply line lengths can be minimized, while at the same time heat transfer from the engine to the heat exchanger 104 is greatly reduced. The lower mounting position of the assembly 102 (as opposed to typical oil cooler location 108) also helps to lower the center of gravity of the motorcycle 100, thereby improving stability and handling.

Figure 2:
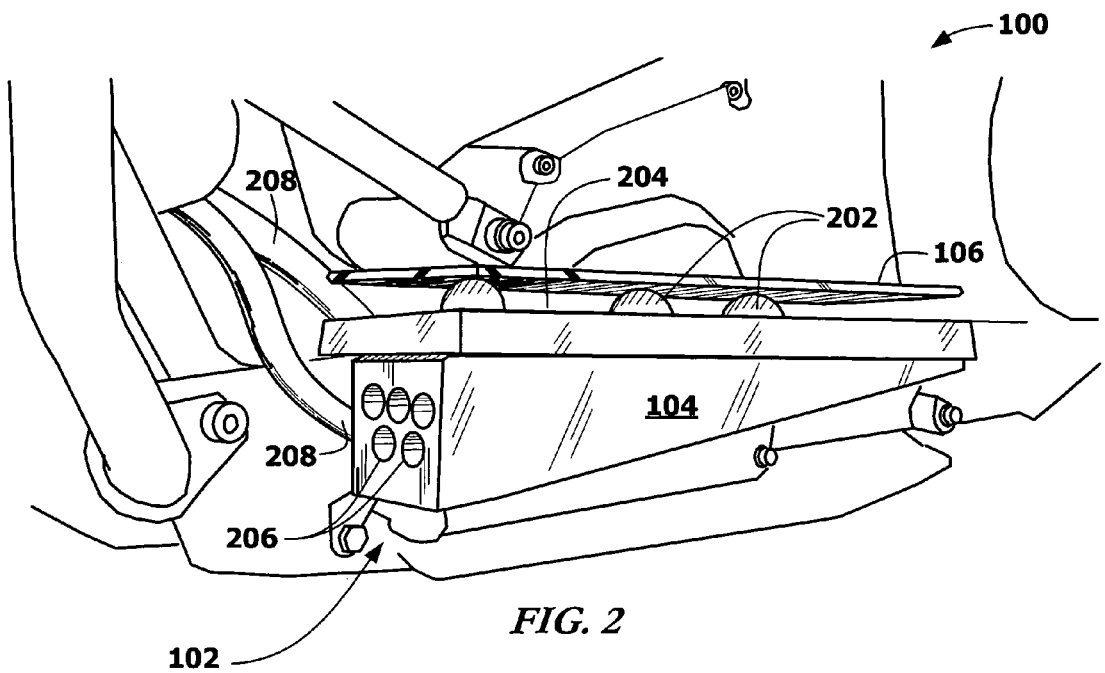
FIG. 2 is a front-left side perspective view of a mounted oil cooler according to an embodiment of the invention.

A closer view of the oil cooler assembly 102 mounted to the motorcycle can be seen in FIG. 2. Because the heat exchanger 104 may get quite hot under certain conditions, thermal separators 202 may be positioned between the foot rest plate 106 and the heat exchanger 104. The separators 202 generally protect the feet of the rider by preventing the foot plate 106 from getting too hot. The separators 202 may be made from a thermally insulating material (e.g., polymer, ceramic, composites) to prevent thermal conduction between the foot plate 106 and the heat exchanger 104. A gap 204 between the foot plate 106 and the heat exchanger 104 also helps prevent thermal conduction of heat therebetween. Other structural elements, such as a thin heat shield (not shown), may be placed in the gap 204 to prevent exchanger-to-plate heat transfer by convection and radiation. The plate 106 may include an insulating material on the top surface to further protect the rider's feet from high temperatures.

The heat exchanger 104 seen in FIG. 2 is generally formed as a hollow enclosure that the oil flows through. The heat exchanger 104 may include a number of longitudinally disposed voids 206 to increase efficiency. The voids 206 are part of the external surface of the exchanger 104, and air moves longitudinally relative to the inside surface of the voids while the motorcycle 100 is moving. The voids 206 increase the effective convection surface area of the heat exchanger 104, thereby increasing the efficiency of the exchanger 104. Other design features may also be included with the voids 206 and heat exchanger body, as described further herein below.

The oil cooler assembly 102 is coupled to engine fluid cavities by way of rigid or flexible hoses 208. The hoses 208 usually include at least one supply line that supplies heated oil to the heat exchanger 104 and at least one return line that returns cooled oil back to the engine. The hoses 208 are coupled to the heat exchanger 104 and engine as is known in the art, including by use of hose clamps and/or threaded hydraulic fittings.

Figure 3:
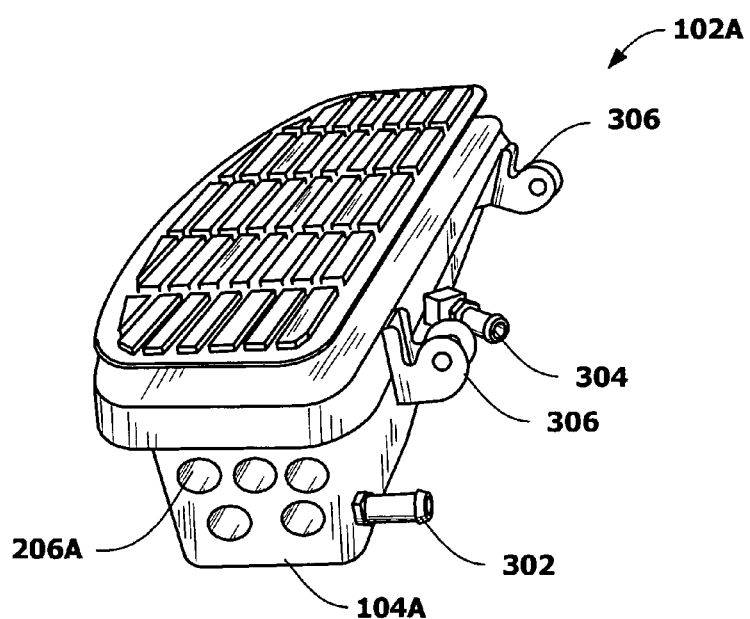
FIG. 3 is a front perspective view of an oil cooler according to an embodiment of the invention.

In reference now to FIG. 3, a front left view of an oil cooler assembly 102A shows mechanical and fluid mounting features. This oil cooler assembly 102A is configured as a mirror image of the assembly 102 seen in FIGS. 1 and 2 (e.g., for right hand side mounting), but may be otherwise similar. The cooler assembly 102A includes oil input and output fittings/ports 302, 304 that are configured to couple oil/fluid lines to the heat exchanger 104A. A mounting member 306 (e.g., a pair of mounting brackets) facilitates mounting the assembly 102A to a motorcycle frame. The mounting member 306 may be sized and positioned to be compatible with existing footrest mounting points, e.g., frame floorboard/footpeg attachments. In such a case, the exchanger 102A can easily be retrofitted onto a motorcycle having these attachments.

Figure 4:
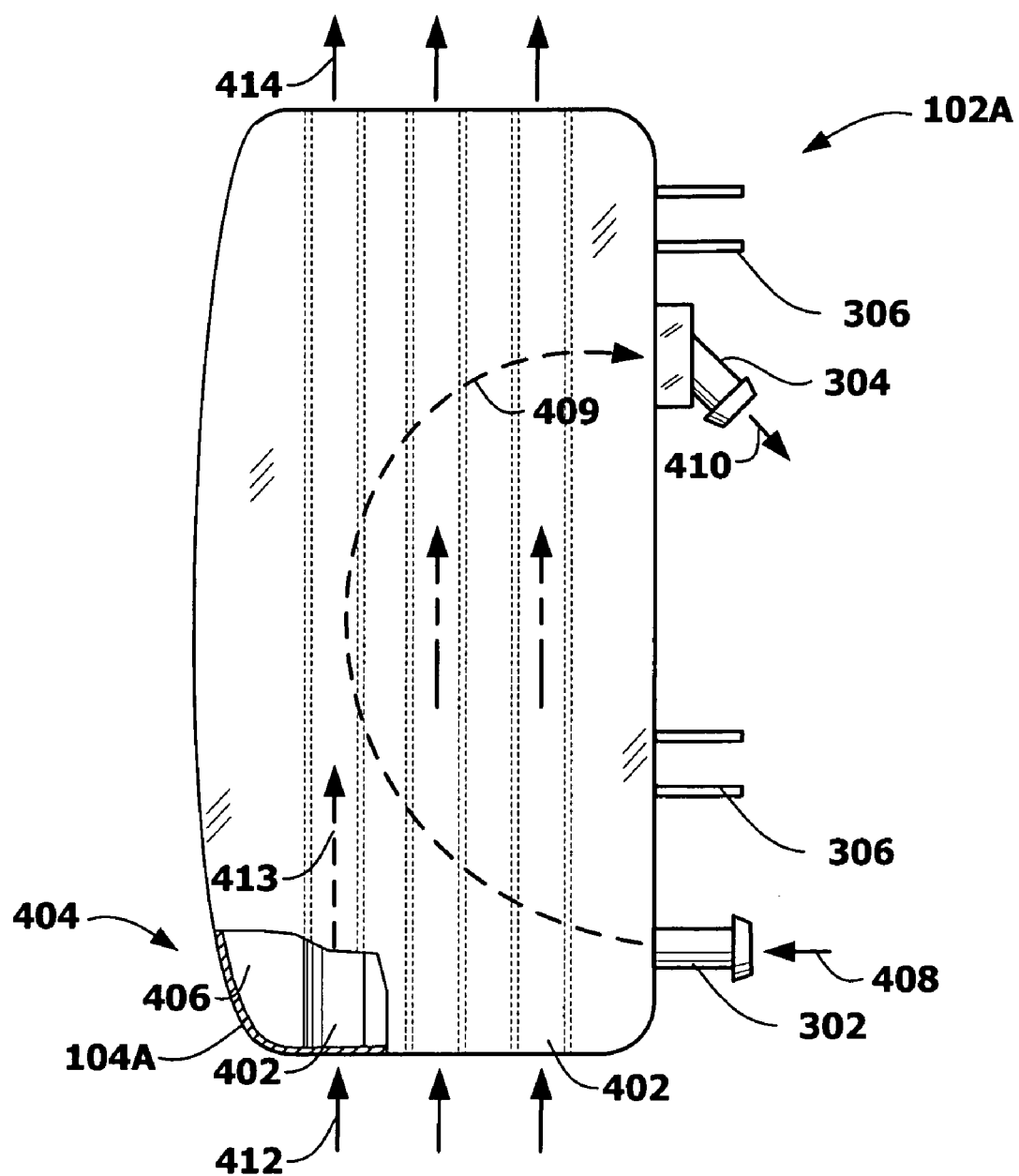
FIG. 4 is a top view of an oil cooler assembly according to an embodiment of the invention.

A top view of the oil cooler assembly 102A is seen in FIG. 4. As can be seen in this view, the heat exchanger 104A includes a number of longitudinally disposed tubes 402, the inner surfaces of which form the voids seen at the leading and trailing edge of the heat exchanger 104A (e.g., voids 206A in FIG. 3). As can be seen from the cutaway portion 404, the outer surface of tubes 402 are in fluid contact with the oil, which flows through the inner volume 406 of the heat exchanger 104A.

In FIG. 4, arrows 408-410 are representative of the path that oil flows inside the heat exchanger 104A. Similarly, arrows 412-414 are representative of paths taken by the air as it move through tubes 402 and over external surfaces of exchanger 104A. It will be appreciated that the direction indicated for oil and air flow is somewhat arbitrary, and these directions may vary based on design considerations. For example, the direction of airflow may be dependent on the orientation of the exchanger 104A relative to motorcycle body, and can vary somewhat from that shown. Similarly, the direction of oil flow can be reversed from that shown (e.g., ports 302, 304 become output and input ports, respectively). Also passages (not shown) can be placed in the exchanger 104A to evenly distribute oil flow through the internal volume 406. Such passages can also force the flow into any direction relative to the airflow to increase efficiency, reduce/increase pressure drop between ports 302, 304, etc.

Those of ordinary skill in the art will be able to readily make and use an oil cooler assembly 102, 102A as described herein. For example, the body of the heat exchanger 104A may be constructed from steel, aluminum, copper, etc., so that such construction has sufficient strength to act as a footrest and thermal properties desired for a heat exchanger. The body of the heat exchanger 104A may be formed by metalworking techniques known in the art, such as welding, casting, machining, extrusion, etc.

Figure 5:
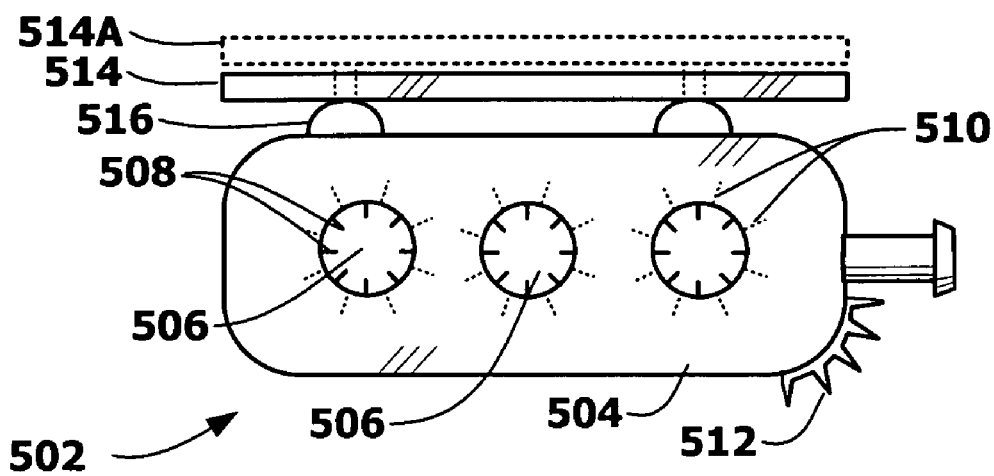
FIGS. 5 and 6 are front views of alternate oil cooler assembly configurations according to an embodiment of the invention.
Figure 6:
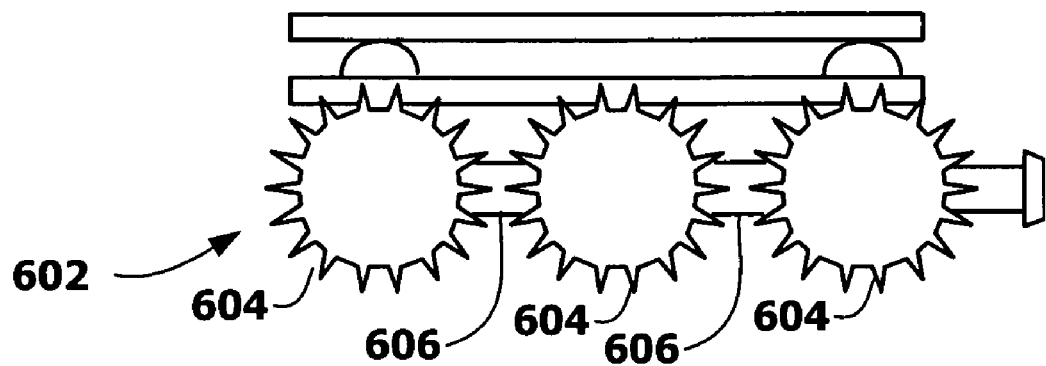

It will be appreciated that there may be many variations on the specific embodiments of the invention shown in FIGS. 1-4. Some alternate embodiments are shown in FIGS. 5 and 6. In FIG. 5, a front view of an oil cooler assembly 502 shows alternate cooling features according to an embodiment of the invention. As with previous embodiments, the oil cooler assembly includes a heat exchanger 504 having longitudinally disposed airflow voids 506. These voids 506 include a plurality of heat dissipation fins 508 that increase airflow surface area, thereby improving heat transfer efficiency. Similarly, the members that form the voids 506 (e.g., tubes) may have internal fins 510 that increase cooling surface area on the fluid-facing side of the heat exchanger 504. The external surface of the heat exchanger 504 may also have similar features, as represented by partially drawn external fins 512, which may be extended to cover any or all of heat exchanger external surfaces (including front and rear facing surfaces relative to view shown in FIG. 5).

The oil cooler assembly 502 in FIG. 5 also includes a foot rest member 514 that may be configured a plate similar to other embodiments. The foot rest member 514 is coupled to the heat exchanger 504 by thermal insulating mounts 516. These mounts 516 may include a variable dimension that allows adjusting the gap between the heat exchanger 504 and foot rest member 514, as indicated in broken lines by adjusted location of foot rest member 514A. Such an adjustment may be useful in regulating the amount of heat transferred from the heat exchanger 504 and foot rest member 514 for varying conditions of use. In cooler weather, for example, the rider may wish to decrease the gap to keep the rider's feet warm. These variable mounts 516 may use any height adjustment mechanism known in the art, including cams, screws, scissors-jack mechanisms, rods/bearings, ratchets, gears, wedges, hydraulic pressure, etc.

An alternate configuration of a heat exchanger 602 according to an embodiment of the invention is shown in the front view of FIG. 6. This heat exchanger 602 may forgo internal voids, and increase surface area by joining multiply longitudinally disposed fluid carriers 604. The illustrated carriers 604 include external features (e.g., fins) that may be integral to the carrier structure (e.g., formed by extrusion) or added later in manufacturer (e.g., similar to conventional radiator fins). The carriers 604 may be coupled by channels 606 that provide mechanical and/or fluid coupling of the carriers 604 to each other. The channels 606 may be formed by assembly of tubes with the carrier bodies, or the carriers 606 and channels 606 may be formed from one piece (e.g., convoluted tubing as in a conventional radiator).

Figure 7:
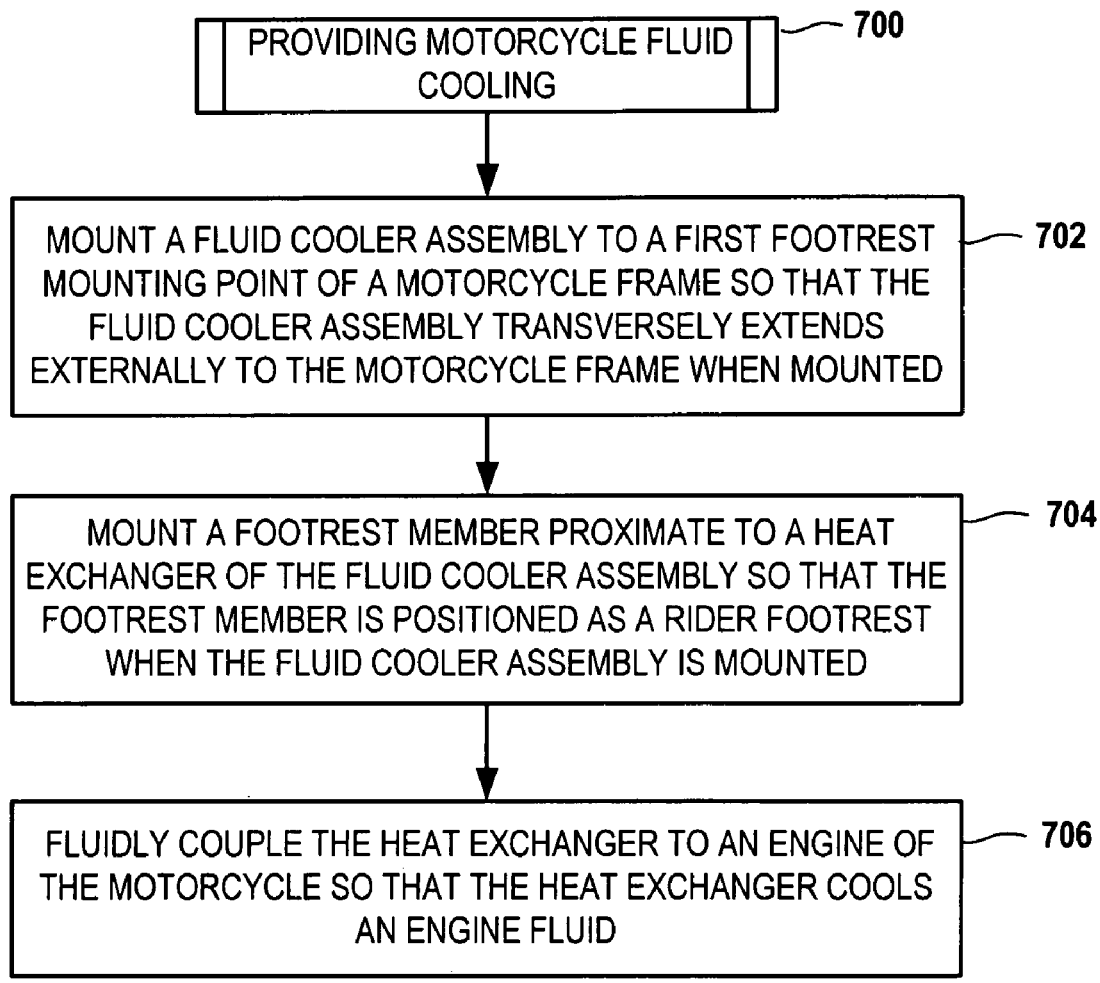
FIG. 7 is a flowchart showing a procedure according to an embodiment of the invention.

In reference now to FIG. 7, a flowchart illustrates a procedure 700 for providing motorcycle fluid cooling according to an embodiment of the invention. A fluid cooler assembly is mounted 702 to a first footrest mounting point of a motorcycle frame so that the fluid cooler assembly transversely extends externally to the motorcycle frame when mounted. A footrest member is mounted 704 proximate to a heat exchanger of the fluid cooler assembly. The footrest member is positioned as a rider footrest when the fluid cooler assembly is mounted. The heat exchanger is fluidly coupled 706 to an engine of the motorcycle so that the heat exchanger cools an engine fluid.

The above description of the embodiments of the invention has been presented for the purposes of illustration and description. It is not intended to be exhaustive or to limit the invention to the precise form disclosed. Many modifications and variations are possible in light of the above teaching. For example, although the embodiments shown herein are described in relation to oil cooling applications, these embodiments may be adapted for any vehicular fluid cooling purpose. For example, a footrest-integrated fluid cooler may be used for engine cooling fluids (e.g., water, antifreeze), hydraulic fluids, phase change refrigerants (e.g., R-134a), etc. Further, this type of cooler may be used on other devices having transversely extending footrests in the path of cooling air, e.g., three-wheeled motor vehicles. A cooler as described herein may be used on one or both driver footrests, and may also be placed on passenger footrests instead of or in addition to driver foot positions. The illustrated embodiments are configured as substantially planar footrests (e.g., floor boards) but may also be integrated with other types of footrests (e.g., foot pegs). It is intended that the scope of the invention be limited not with this detailed description, but rather determined by the claims appended hereto.

What is claimed is:

1. A fluid cooler assembly comprising:
   a heat exchanger;
   a mounting member coupled to the heat exchanger that mounts the heat exchanger to a first footrest mounting point of a motorcycle frame so that the heat exchanger transversely extends externally to the motorcycle frame in a mounted configuration of the fluid cooler assembly, wherein the mounting member is compatible with existing attachments of a first rider footrest previously mounted at the first foot rest mounting point;
   fluid ports coupled to the heat exchanger; and
   a footrest member coupled to the heat exchanger, wherein the footrest member is positioned, in the mounted configuration of the fluid cooler assembly, to retrofit the motorcycle frame by replacing the first rider footrest previously mounted at the first foot rest mounting point.

2. The fluid cooler assembly of claim 1, wherein the heat exchanger comprises an oil cooler.

3. The fluid cooler assembly of claim 1, further comprising:
   a second heat exchanger;
   a second mounting member coupled to the second heat exchanger that mounts the second heat exchanger to a second footrest mounting point of the motorcycle frame so that the second heat exchanger transversely extends externally to the motorcycle frame in the mounted configuration of the fluid cooler assembly, wherein the mounting member is compatible with existing attachments of a second rider footrest previously mounted at the second foot rest mounting point;

second fluid ports coupled to the second heat exchanger; and a second footrest member coupled to the second heat exchanger, wherein the second footrest member is positioned, in the mounted configuration of the fluid cooler assembly, to retrofit the motorcycle frame by replacing the second rider footrest previously mounted at the second foot rest mounting point, and wherein the first and second footrest members together form a motorcycle footrest for a rider in the mounted configuration of the fluid cooler assembly.

4. The fluid cooler assembly of claim 3, wherein the second mounting member, second heat exchanger, second fluid ports, and second footrest member are mirror images, respectively, of the mounting member, the heat exchanger, the fluid ports, and the footrest member.

5. The fluid cooler assembly of claim 1, wherein the heat exchanger comprises airflow voids disposed substantially parallel to a longitudinal axis of the motorcycle frame, wherein internal surfaces of the airflow voids comprise fluid cooling surfaces of the heat exchanger.

6. The fluid cooler assembly of claim 1, wherein the footrest member comprises a plate.

7. The fluid cooler assembly of claim 1, further comprising a thermal insulating mount coupled between the footrest member and the heat exchanger.

8. The fluid cooler assembly of claim 7, wherein a dimension of the thermal insulating mount is user adjustable to facilitate varying a distance between the heat exchanger and the footrest member.

9. The fluid cooler assembly of claim 1, wherein first footrest mounting point comprises a driver footrest mounting point.

10. The fluid cooler assembly of claim 1, wherein the heat exchanger comprises at least one external cooling face disposed perpendicularly to forward airflow.

11. A motorcycle, comprising:
a frame including front and rear wheels mounted thereon, and having a footrest mount point at a rider footrest position for attaching a previously installed rider footrest;
an engine having two or more fluid lines;
a first, footrest-integrated, fluid cooler mounted to the footrest mount point, the first fluid cooler comprising:
a heat exchanger extending outward from the frame proximate to the footrest mount point;
two or more fluid ports providing fluid coupling between the heat exchanger and the fluid lines; and
a footrest member coupled to the heat exchanger so that the footrest member is positioned, when the first fluid cooler is mounted, to retrofit the motorcycle by replacing the previously installed rider footrest.

12. The motorcycle of claim 11, wherein the first fluid cooler comprises an oil cooler.

13. The motorcycle of claim 11, wherein the frame further comprises a second footrest mount point at a second footrest position, the motorcycle further comprising:

a second, footrest-integrated, fluid cooler mounted to the second footrest mount point comprising:
a second heat exchanger extending outward from the frame proximate to the second footrest mount point;
two or more second fluid ports providing fluid coupling between the second heat exchanger and the fluid lines; and
a second footrest member coupled to the second heat exchanger so that the second footrest member is positioned as a second rider footrest when the second fluid cooler is mounted.

14. The motorcycle of claim 13, wherein the second fluid cooler is a mirror image of the first oil cooler.

15. The motorcycle of claim 11, wherein the heat exchanger comprises airflow voids disposed substantially parallel to a longitudinal axis of the motorcycle, wherein internal surfaces of the airflow voids comprise fluid cooling surfaces of the heat exchanger.

16. The motorcycle of claim 11, wherein the footrest member comprises a plate.

17. The motorcycle of claim 11, wherein the first oil cooler further comprises a thermal insulating mount coupled between the footrest member and the heat exchanger.

18. The motorcycle of claim 17, wherein a dimension of the thermal insulating mount is user adjustable to facilitate varying a distance between the heat exchanger and the footrest member.

19. A method comprising:
mounting a fluid cooler assembly to a first footrest mounting point of a motorcycle frame so that the fluid cooler assembly transversely extends externally to the motorcycle frame when mounted;
mounting a footrest member proximate to a heat exchanger of the fluid cooler assembly, wherein the footrest member is positioned to a rider footrest previously mounted to the first footrest mounting point when the fluid cooler assembly is mounted; and
fluidly coupling the heat exchanger to an engine of the motorcycle so that the heat exchanger cools an engine fluid.

20. The method of claim 19, wherein the engine fluid comprises engine oil.

21. The method of claim 19, further comprising:
mounting a second fluid cooler assembly to a second footrest mounting point of the motorcycle frame so that the second fluid cooler assembly transversely extends externally to the motorcycle frame when mounted;
mounting a second footrest member proximate to a second heat exchanger of the second fluid cooler assembly, wherein the footrest member is positioned as a rider footrest when the second fluid cooler assembly is mounted; and
fluidly coupling the second heat exchanger to the engine of the motorcycle so that the second heat exchanger cools the engine fluid.

22. The method of claim 19, further comprising facilitating user adjustment of a distance between the heat exchanger and the footrest member to adapt the footrest member for varying conditions of use.

23. The method of claim 19, further comprising removing the motorcycle footrest previously mounted at the first foot rest mounting point before mounting the fluid cooler assembly to the first footrest mounting point.

* * * * *